[72] Inventor Lloyd A. Taylor
Santa Clara, Calif.

[21] Appl. No. 792,237
[22] Filed Jan. 16, 1969
[45] Patented Oct. 5, 1971
[73] Assignee North American Rockwell Corporation

[54] MULTIPURPOSE SERIAL/PARALLEL MULTIPLIER
7 Claims, 6 Drawing Figs.

[52] U.S. Cl. .......... 235/164, 235/156
[51] Int. Cl. .......... G06f 7/38, G06f 7/39
[50] Field of Search .......... 235/164, 156

[56] References Cited

UNITED STATES PATENTS 3,500,026 3/1970 Pokorny .......... 235/160

OTHER REFERENCES

Arithmetic Operations in Digital Computers R. K. Richards, D. Van Nostrand Co., 1955, pgs. 155- 160

Digital Computer Design Fundamentals, Yaohan Chu, McGraw-Hill 1962, pgs. 445- 446

IBM Technical Disclosure Bulletin, L. Y. Liu and M. W. Bee, Vol. 9, No. 2, July 1966, pgs. 171- 173

*Primary Examiner*—Malcolm A. Morrison
*Assistant Examiner*—James F. Gottman
*Attorneys*—L. Lee Humphries, Edward Dugas, H. Fredrick Hamann and Robert G. Rogers

ABSTRACT: A multiplier for multiplying an $n$-bit multiplicand number which comprises an $n$-number of input terminals with means for storing one bit of the $n$-bit number in parallel at each input terminal, a multiplier terminal and means for applying multiplier bits serially to the multiplier terminal, with an $n$-number of gates with one gate receiving one bit from one input terminal and with each gate connected to receive the serial bits from the multiplier terminal. A first delay means is connected to the output of the first gate. An $n-1$ number of adders, each connected to receive as an input the output of the remaining gates. The output of the first delay means connected to the input of the first adder, the adders being serially connected with delay means interposed between each adder to enable the sum output from a preceding adder to be summed with the output from a succeeding gate. Delay means connected in feedback relation to each adder to store a carry bit from the adder for one bit and to feed the carry back to the adder during the next clock time.

INVENTOR.
LLOYD A. TAYLOR
BY Edward Dugas
ATTORNEY

| | | |
|---|---|---|
| Multiplicand $L_4$ $L_3$ $L_2$ $L_1$ | 1110 | 14 |
| Multiplier $M_4$ $M_3$ $M_2$ $M_1$ | 1101 | 13 |
| | 1110 | 42 |
| | 0000 | |
| | 1110 | 14 |
| | 1110 | |
| Product | 10110110 | 182 |

| Clock Period | | A3 | A2 | A1 | |
|---|---|---|---|---|---|
| | | 0 | 0 | 0 | Delayed Sum In |
| | | 0 | 0 | 0 | Delayed Carry In |
| 1 | 1 | 1 | 1 | 0 | $L_4 M_1$ $L_3M_1$ $L_2M_1$ $L_1 M_1$ |
| | | 1 | 1 | 0 | Sum Out |
| | | 0 | 0 | 0 | Carry Out |
| | | 1 | 1 | 1 | Delayed Sum In |
| | | 0 | 0 | 0 | Delayed Carry In |
| 2 | 0 | 0 | 0 | 0 | $L_4 M_2$ $L_3M_2$ $L_2M_2$ $L_1 M_2$ |
| | | 1 | 1 | 1 | Sum Out |
| | | 0 | 0 | 0 | Carry Out |
| | | 0 | 1 | 1 | Delayed Sum In |
| | | 0 | 0 | 0 | Delayed Carry In |
| 3 | 1 | 1 | 1 | 0 | $L_4 M_3$ $L_3M_3$ $L_2M_3$ $L_1 M_3$ |
| | | 1 | 0 | 1 | Sum Out |
| | | 0 | 1 | 0 | Carry Out |
| | | 1 | 1 | 0 | Delayed Sum |
| | | 0 | 1 | 0 | Delayed Carry In |
| 4 | 1 | 1 | 1 | 0 | $L_4M_4$ $L_3M_4$ $L_2M_4$ $L_1M_4$ |
| | | 0 | 1 | 0 | Sum Out |
| | | 1 | 1 | 0 | Carry Out |

FIG. 2a

INVENTOR
LLOYD A. TAYLOR
BY Edward Dugas
ATTORNEY

| | | | |
|---|---|---|---|
| Multiplicand $L_4$ $L_3$ $L_2$ $L_1$ | | 1110 | 14 |
| Multiplier $M_4$ $M_3$ $M_2$ $M_1$ | | 1101 | 13 |
| | | 1110 | 42 |
| | | 0000 | |
| | | 1110 | 14 |
| | | 1110 | |
| Product | | 10110110 | 182 |

| Clock Period | | $A_3$ | $A_2$ | $A_1$ | |
|---|---|---|---|---|---|
| | | 1 | 0 | 1 | Delayed Sum In |
| | | 1 | 1 | 0 | Delayed Carry In |
| 5 | 0 | 0 | 0 | 0 | $L_4 0$ $L_3 0$ $L_2 0$ $L_1 0$ |
| | | 0 | 1 | [1] | Sum Out |
| | | 1 | 0 | 0 | Carry Out |
| | | 0 | 0 | 1 | Delayed Sum In |
| | | 1 | 0 | 0 | Delayed Carry In |
| 6 | 0 | 0 | 0 | 0 | $L_4 0$ $L_3 0$ $L_2 0$ $L_1 0$ |
| | | 1 | 0 | [1] | Sum Out |
| | | 0 | 0 | 0 | Carry Out |
| | | 0 | 1 | 0 | Delayed Sum In |
| | | 0 | 0 | 0 | Delayed Carry In |
| 7 | 0 | 0 | 0 | 0 | $L_4 0$ $L_3 0$ $L_2 0$ $L_1 0$ |
| | | 0 | 1 | [0] | Sum Out |
| | | 0 | 0 | 0 | Carry Out |
| | | 0 | 0 | 1 | Delayed Sum In |
| | | 0 | 0 | 0 | Delayed Carry In |
| 8 | 0 | 0 | 0 | 0 | $L_4 0$ $L_3 0$ $L_2 0$ $L_1 0$ |
| | | 0 | 0 | [1] | Sum Out |
| | | 0 | 0 | 0 | Carry Out |

FIG. 2b

INVENTOR
LLOYD A. TAYLOR
BY Edward Digas
ATTORNEY

INVENTOR.
LLOYD A. TAYLOR

BY Edward Dugas
ATTORNEY

INVENTOR.
LLOYD A. TAYLOR
BY Edward Dugas
ATTORNEY

INVENTOR.
LLOYD A. TAYLOR
BY Edward Dygas
ATTORNEY

MULTIPURPOSE SERIAL/PARALLEL MULTIPLIER

BACKGROUND OF THE INVENTION

This invention relates generally to the field of digital multipliers and more particularly to a digital multiplier having serial-multiplier and parallel-multiplicand inputs.

Serial-parallel arrangements of components in the computer art whereby binary characters are processed in parallel to provide a factor of speed which is normally unavailable in a serial-serial system. One form of serial-parallel arrangement for a multiplier is disclosed in the *Computer Handbook* by H. D. Huskey and G. A. Korn, published in 1962 by the McGraw Hill Book Company, Inc. on pages 15–20. That multiplier has been given the name "Whiffle Tree" multiplier. In that device, the binary multiplicand arrives on a single channel and through appropriate delay lines two, four, and eight times the multiplicands are produced. In the four-bit system shown, the four bits of the multiplier gate these factors and a series of single-channel binary adders combine these to give the product. The electronics industry of today is directing its efforts towards microminiature integrated circuits of extremely small size. The actual implementation of the "Whiffle Tree" multiplier requires an extensive number of logic circuits as compared to the present invention. Therefore, when size is a critical parameter it becomes extremely important to reduce the number of circuits necessary to perform the same function with the same degree of accuracy. Applicant's invention solves this problem.

SUMMARY OF THE INVENTION

In one preferred embodiment of this invention, the serial/parallel multiplier has a 1- -*n*-number of multiplicand input terminals for receiving an *n*-bit number in parallel with the most significant bit applied to the *n*th terminal and the least significant bit applied to the 1 terminal. A serial multiplier terminal is adapted to receive a bit number serially with the least significant bit appearing first. An *n*-number of gates are each connected to the multiplier terminal with an input to a numbered gate connected to a corresponding numbered multiplicand input terminal. An *n*31 1 number of serially connected adders are each connected to receive the output of a corresponding numbered gate. An $n-1$ number of delay means are interposed between each adder with the $n-1$ numbered delay means connected to the *n*th gate. Each delay means retards a received bit for one clock time.

A $n-1$ number of delay feedback means are connected to each adder to receive a carry bit from an adder to retard the carry bit for one clock time and to feed the carry bit then to the input of the adder; and an output terminal at said 1 numbered adder is provided for receiving the binary product output.

In another embodiment of the invention capable of multiplying either positive or negative numbers, when the numbers are represented in 2's complement notation, a sign spread circuit is used to spread the last bit of the serial number appearing at the multiplier terminal with the last bit being indicative of the *sign* of the serial number. An inverter is interposed between the ($n-1$adder and the ($n-1$) n-1) delay means with an "OR" gate interposed between the feedback delay carry means for the ($n-1$) of the serial multiplier number provides one input to the "OR" gate with the delay carry for the ($n-1$) adder providing the other input. This configuration enables the serial/parallel multiplier to perform positive, negative or mixed multiplication.

Accordingly, it is an object of the present invention to provide a novel serial/parallel multiplier.

It is a further object of the present invention to provide a binary multiplier capable of performing positive, negative or mixed multiplication.

It is another object of the present invention to provide a novel serial/parallel multiplier capable of multiplying *n*-length bit numbers.

The aforementioned and other objects of the present invention will become more apparent when taken in conjunction with the following description and drawings, throughout which like characters indicate like parts, and which drawings form a part of this application.

DESCRIPTION OF THE DRAWINGS

FIGS. 2A and 2B are charts useful in understanding the operation of the embodiment illustrated in FIG. 1;

DESCRIPTION OF THE PREFERRED EMBODIMENTS

Figure 1:
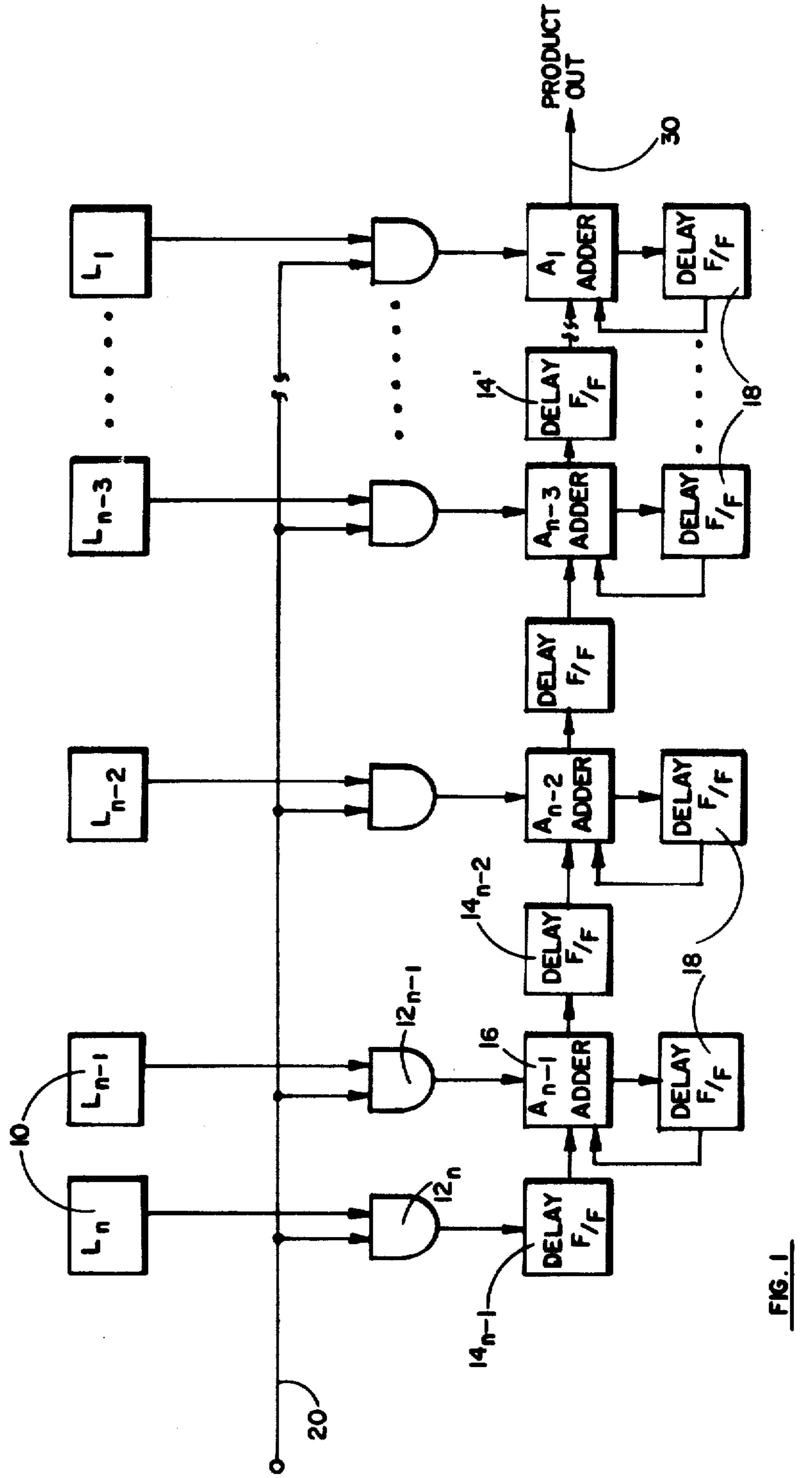
FIG. 1 illustrates in block diagram form one preferred embodiment of the invention.

Referring to FIG. 1, an *n*-number of multiplicand input terminals 10, each receive one designated bit of an *n*-bit number in parallel. The input terminals may be a set of *n*-flip-flops or an *n*-number of fixed input lines. The bits, L, are weighted such that $L_n$ is the most significant bit and $L_1$ is the least significant bit. A serial input terminal 20 receives the multiplier bits serially with the least significant bit appearing first. An *n*-number of AND gates, $12_n$ to $12_1$, are each connected to the multiplier terminal 20. The AND gates also have one input terminal connected to one corresponding *n*-numbered multiplicand terminal 10. The output from AND gate $12_n$ is fed to a delay means $14_{n11}$, which may be a flip-flop, for delaying the AND gate output by one clock period. An $n-1$ number of adder means 16 are serially connected together with each adder receiving the output from a corresponding *n*-numbered gate 12. A total of $n-1$ delay means 14 are provided with one means interposed between each adder means 16. An $n-1$ number of delay means 18 are each connected to a corresponding *n*-numbered adder means 16 to receive the carry output from the adder, and to delay the carry one clock period and to feed the delayed carry back to the input of the respective adder. Delay means 18 may be flip-flops which are controlled by clock pulses. The output of the multiplier is taken from the $A_1$ adder by means of the product line 30.

In operation, normal binary multiplication is performed by successive additions and shifting. The process is controlled by the multiplier bits (binary digits). During the multiplication, if the specific multiplier bit is a "1," the multiplicand of approximate weight is added to the sum of the partial product. If the multiplier bit is "0," no addition is performed.

When a "1" bit appears on the multiplier serial-input line 20, the stored multiplicand is gated to the adders 16 through the AND gates 12. The sums generated by the adders are delayed one-bit time by the delay means 14 and are used as inputs to the next adders. The carries from the adders are stored in the one-bit-delay elements 18, the outputs of which are fed back into the adders during the next clock time.

If the first bit of the multiplier is a "1," the multiplicand is sent to the adder, and the first partial product is generated. An "0" in the first bit of the multiplier causes all "0's" to be sent to the adders, and the first partial product will also be all "0' s." The least-significant bit of the product will appear at the sum output of the last adder on the product line 30 during the first clock period. Then, if the second bit of the multiplier is a "1," the multiplicand of the product will appear at the sum output of the last adder during the second clock period. The process is repeated for each bit of the multiplier. The most significant bit of the product will appear at the output during clock time 2*n*.

Referring to FIGS. 2A and 2B, the multiplicand bits are labeled $L_1$ through $L_4$ for a four-bit example, with $L_4$ being the most significant bit, and $L_1$ the least significant bit. The multiplier bits are labeled $M_1$ through $M_4$ for a four-bit example, with $M_4$ being the most significant bit and $M_1$ the least significant bit. As an example, consider the binary multiplication of two numbers: 14, the multiplicand, represented by 1110; and 13, the multiplier, represented by 1101. Since four-bit numbers are used, three full-adders 16 are required for a serial/parallel multiplication. Refer to the column beneath $A_3$, $A_2$ and $A_1$ which describe the specific inputs and outputs of each adder during any given clock period. Initially the inputs and outputs of the adders are "O's." This establishes that the "-delayed sum in" and the "delayed carry in" during the 1st clock period will be "0's" to the adders.

Clock-period 1

A "1" exists on the serial-input line 20. The multiplicand is transferred through the AND gates 12. The three inputs to each adder are totalled. A "1" generated at the "sum out" of adders $A_3$ and $A_2$. A "0" is generated at the "sum out" of $A_1$. This "0" is the least significant bit of the binary product. All "carry outs" are "0's."

Clock-Period 2

The $A_1$ "delayed-sum in" is obtained from the $A_2$ "sum out" of the previous clock period; the $A_2$ "delayed sum in" is obtained from the $A_3$ "sum out" of the previous clock period; the $A_3$ "delayed-sum in" is obtained from the ANDed function of the most significant bit of the multiplicand and the bit which existed on the multiplier-serial-input line during the previous clock period ($L_4M_1$). The "delayed-carry ins." are all "0's" since the "carry outs" during the previous clock period were all "0's." The existing bit on the multiplier-serial-input line is "0," therefore all "0's" rather than the multiplicand are transferred through the AND gates. The three inputs to the adders are totalled. All "sum outs" are "1's," the "sum out" of the $A_1$ adder becomes the second bit of the binary product. All "carry outs" are "0's."

Clock-Period 3

The "delayed-sum ins" are formed in the same manner as described in clock-period 2, $L_4M_2$ becomes the $A_3$ "-delayed-sum in." All "carry ins" are "0's." The bit on the multiplier-serial-input line is a "1," the multiplicand is therefore transferred through the AND gates. The three inputs to each adder are totalled, and the outputs are generated. The "1" at the "sum out" of adder becomes the third bit of the binary product. Note that a "carry out" has been generated by the $A_2$ adder.

Clock-Period 4

$L_4M_3$ provides the $A_3$ "delayed-sum in." The "carry in" of the $A_2$ adder is a 1 Since the resisting bit on the multiplier-serial-input line is a "1," the multiplicand is transferred thru the AND gates. The three inputs to the adders are totalled. A "1" is produced by the $A_2$ adder "sum out" The 0 produced by the $A_1$ adder sum to becomes the fourth bit of the binary product. Two "1's" are produced in the "carry outs," the one by $A_3$ and the other by $A_2$.

Clock-period 5

$L_4M_4$ provides the $A_3$ "delayed-sum in." The "carry ins" are 110 respectively. Since there are no more bits on the multiplier-serial-input line, "0's" will henceforth be transferred thru the AND gates. It is remembered that eight clock-pulse periods are required for the four-bit binary numbers, since binary multiplication produces double-length products. Inputs are totalled, the "1" produced by the $A_1$ adder "sum out" becomes the fifth bit of the binary product.

Clock-Period 6

Appropriate inputs are totalled. The "1" produced by the $A_1$ adder "sum out" becomes the sixth bit of the binary product.

Clock-Period 7

Appropriate inputs are totalled. The "0" produced by the $A_1$ adder "sum out" becomes the seventh bit of the binary product.

Clock-Period 8

Appropriate inputs are totalled. The "1" produced by the $A_1$ adder "sum out" becomes the eighth and last bit of the binary product.

A check of sequentially comparing bits from the calculated example and the "sum output" of the $A_1$ adder verifies the results. The calculated example bits are read from right to left, that is, least-significant to most-significant bit.

Figure 3:
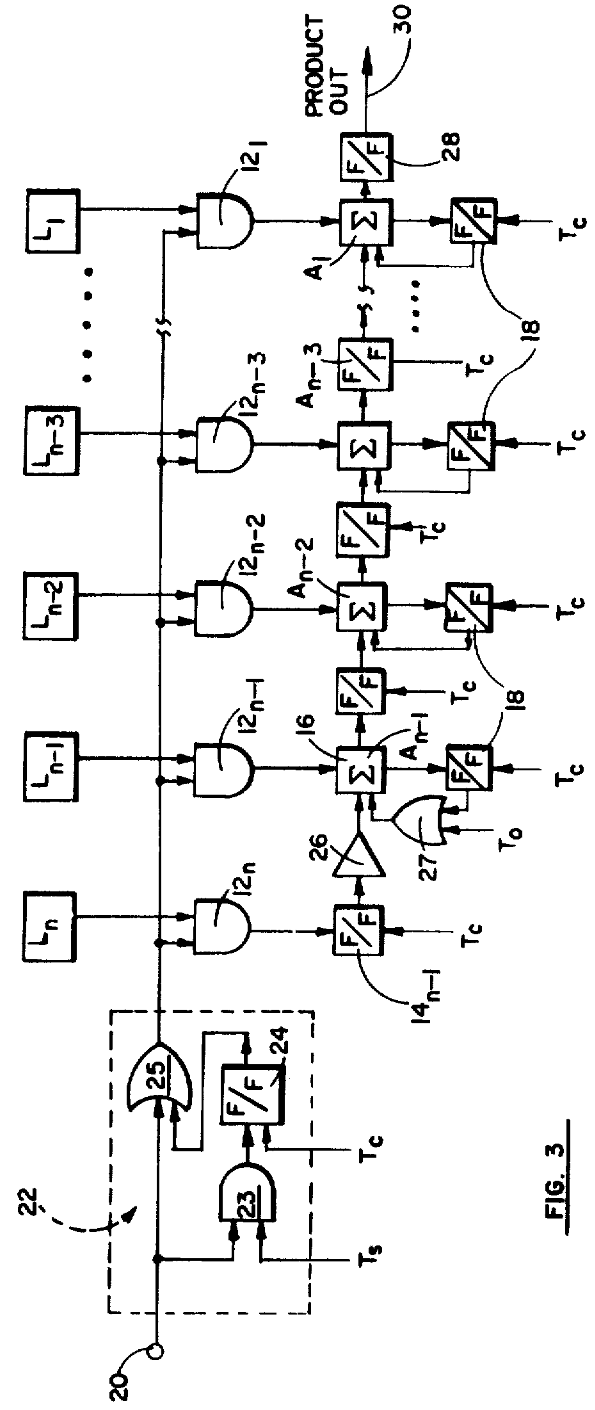
FIG. 3 illustrates in block diagram form a second embodiment of the invention.

In FIG. 3, a second embodiment of the serial/parallel multiplier is illustrated which has the capability of multiplying either positive or negative numbers when the numbers are represented in two's complement notation. The most-significant bit $L_n$ in the multiplicand, the most-significant bit $M_n$ in the multiplier (the last bit on the serial-input line) and the most-significant bit in the product carry the sin of their respective numbers. An "0" indicates a positive number and a "1" indicates a negative number.

A network 22 is used as a spreading means to spread the sign bit of the multiplier number. An AND gate 23 has one of its input terminals connected to the terminal 20 and the other of its inputs to a timing pulse source *Ts* where the *Ts* pulse is generated at the last (or sign bit) of the serial input. The "OR" gate 25 is interposed in the serial line 20. The output of AND gate 23 is connected to the input of the flip-flop 24 with the other input to flip-flop 24 being a timing pulse *Tc*, which corresponds to the last (or sign bit) of the product. The output of the flip-flop 24 is fed to the other input of the OR gate 25. In operation, the sign, or most-significant bit of the multiplier, sets the flip-flop 24 during the bit time *Ts*, consequently the sign of the multiplier is a continuous input to the AND gates during the period that the last half of the product is formed.

A timing pulse, $T_0$, occuring during the least-significant bit of the product is ORed with the "delayed carry" of the first adder. This input along with the inverted $L_nM_1$ form the proper input to the first adder. It may be seen if the multiplicand is positive, $L_n$ will be a "0" and the output of the $L_n$ AND gate 12$_n$ will therefore always be a "0." Inverting this "0" will present a "1" to the "delayed-sum in" of the first adder $A_{n-1}$. The invention is accomplished by interposing an inverter 26 between the output of the delay means 14$_{n-1}$ and the input to the adder $A_{n11}$. $T_0$ causes the first "delayed-carry in" also to be a "1." This function is accomplished by inserting an OR gate 27 in the feedback path of delay means 18 attached to the adder $A_{n11}$. The other input of the OR gate 27 is the timing pulse $T_0$. These two inputs continuously cause the generation of a "carry out" and subsequently the "sum out" of the first adder represents only the input from the $L_{n11}$ AND gate. If the multiplicand is negative, $L_n$ will be "1," and the output of the $L_n$ AND gate will be determined by the existing multiplier-serial-input bit during each clock period. This circuitry operates as a subtractor whose function is determined by the sign of the multiplicand and by the existing multiplier-serial-input bit.

The operations of the *sign spreader* and the *subtractor* perform the corrective measures which enable the serial/parallel multiplier to perform positive, negative or mixed multiplication. An additional delay means 28 receives the output from the adder $A_1$ causing the production of the $2n$-bit product to begin, not at the clock pulse coincident with the arrival of the multiplier, but at the following clock pulse. The actual product will not conclude until $2n+1$ clock pulses have occurred. It must be remembered that since one bit of each number being multiplied is a sign bit, only $2n-1$ bits of the product are necessary. The last bit of the product (most significant) is identical to the second-to-the-last bit (second most significant). Each bit represents the sign of the product. If two three-bit numbers are multiplied, a six-bit product is produced. Since only two bits of the three-bit numbers represent magnitude, the product will contain four bits of meaningful magnitude information. The remaining two bits will be identical bits indicating the sign of the product. This characteristic is utilized during required trunction operations.

$T_c$ is a timing pulse which occurs during the last bit, or second-bit of the product. $T_c$ clears all the delay elements.

This clearance readies the multiplier for the next multiplication.

Figure 4:
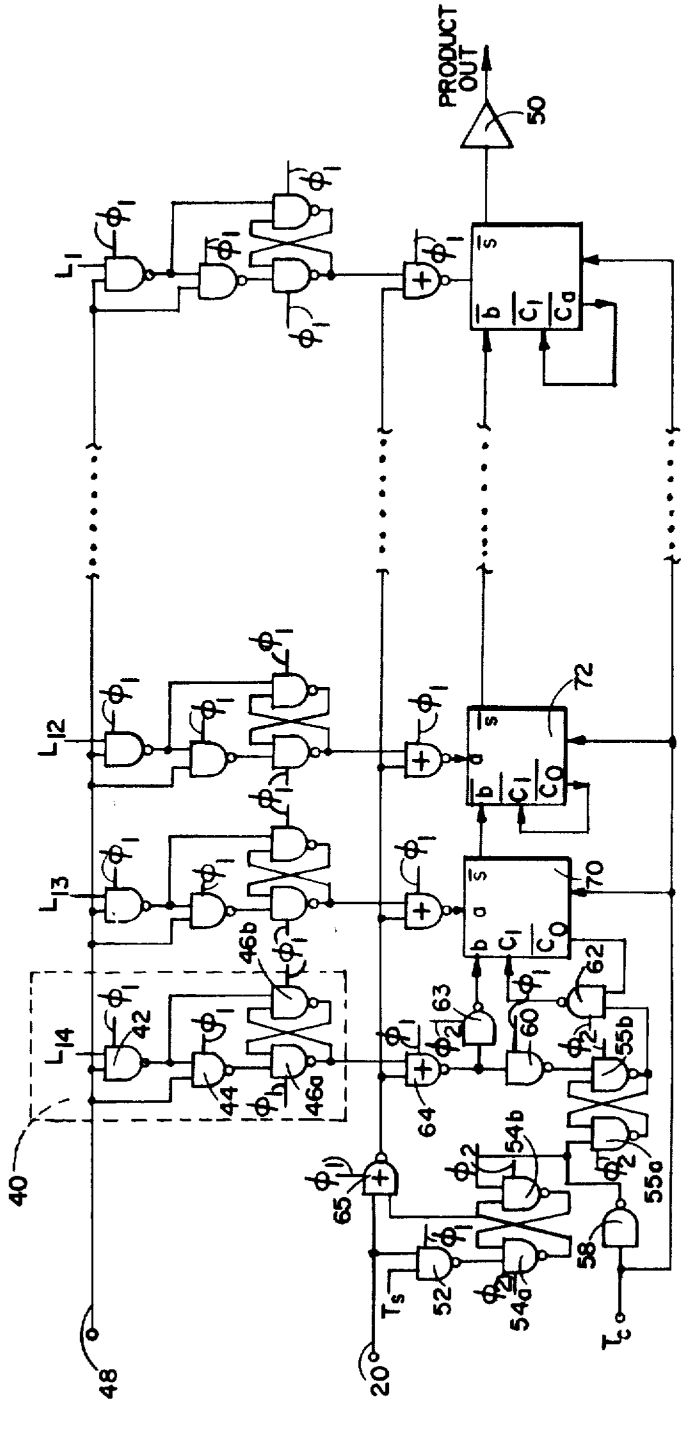
FIG. 4 is a schematic diagram of a third embodiment of the invention.

In FIG. 4 a third embodiment of this invention is shown. The third embodiment is functionally equivalent to the embodiment illustrated in FIG. 3 but is different in component structure. The delay means 14 and the feedback delay means 18 used in the preceding embodiment are eliminated by using 2$\phi$ timing. The use of multiphase timing aside from inherently providing delay characteristics also diminishes the multiplier's power requirements.

The parallel multiplicand input means of FIG. 4 is comprised of a multiplicand register of $n$-identical register 40. Each register 40 provides a permanent storage for a multiplicand bit $L_n$. The enabling of the "load" signal, a "1," on line 48 transfers the multiplicand input bit $L_n$ into permanent storage. Multiplier and multiplicand input bits are provided to the register and multiplier terminal in 2's complement notation. The sign bit for both the multiplier and the multiplicand occupy the most-significant bit positions. The registers each contain four gates, 42, 44, 46*a* and 46*b*, which are clocked with one phase $\phi_1$. Gates 46*a* and 46*b* are cross coupled as a flip-flop such that the output of each is fed back to the input of the other. The output of the register is taken from the output of gate 46*a*. Gate 42 has one input connected to line 48 and on the other input it receives a corresponding multiplicand bit. The output of gate 42 is connected to the one input of gates 44 and 46*b*. The other input of gate 44 is connected to line 48 with the output of gate 44 connected to the input of gate 46*a*.

A product correction network 50 operates to provide the correct sign to the output bit product. The correction network is comprised of two pairs of gates, 54*a* and 54*b*, and 55*a* and 55*b* with each pair cross coupled to operate as flip-flops. Both pairs of flip-flops are clocked with a $\phi_2$ clock pulse. A gate 52 is converted to receive serial bits from the multiplier terminal 20 and a $T_s$ bit which is the multiplier sign bit timing pulse. Gate 52 is clocked with $\phi_1$ clock pulse. The output of gate 52 is fed to one input of gate 54*a*. $A_m$ adder 65 has one of its inputs connnected to the multiplier terminal 20.

The other input of adder 65 is connected to the output of gate 54*a*. A gate 58 is connected to receive a pulse $T_c$, which is the product sign bit timing pulse. The output of gate 58 is fed to the input of gate 54*b*. The adder 64 receives one input from gate 46*a* and the other from gate 65. The output of gate 64 is fed to "AND" gate 63 and 60. The output of gate 60 is fed to the input of gate 55*b*. Gate 62 is connected to the adder 70 to receive the output from terminal $\overline{C}_0$ and to feed it back to input terminal $C_1$. The other input to gate 62 is connected to the output of gate 55*b*. The output of gate 63 is connected to the adder input terminal *b*. Gates 62 and 63 are clocked with a $\phi_2$ phase clock pulse and gates 60 and 64 are clocked with a $\phi_1$ phase clock pulse.

Figure 5:
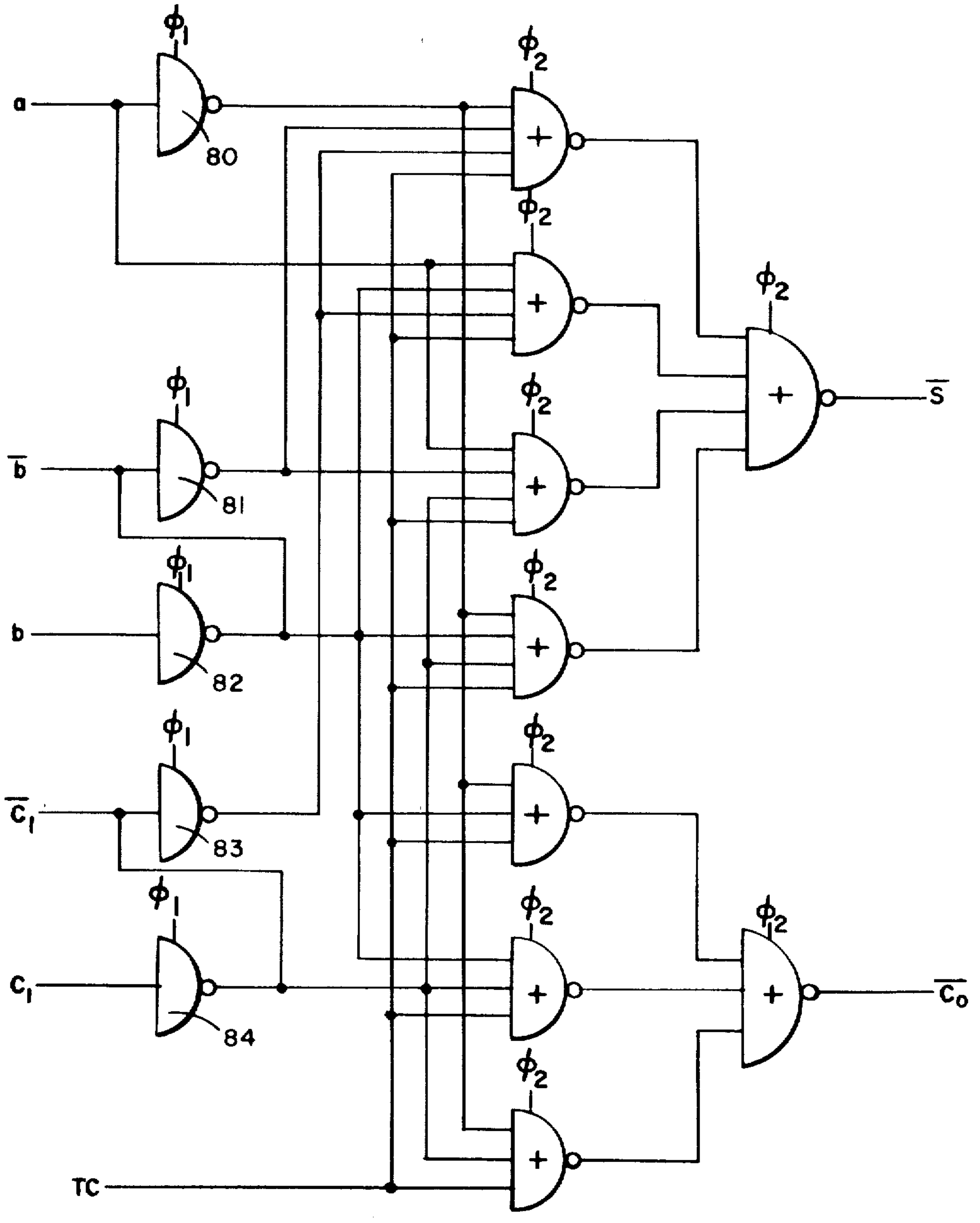
FIG. 5 is a schematic diagram of an adder used with the invention.

In FIG. 5 the adder blocks are shown in schematic form. All of the adders except adder 70 are connected as shown. The adder 70 uses the *b* and C terminals for inputs instead of the $\overline{b}$ and $\overline{c}$ terminals, and instead of electrical connection between input terminal $\overline{b}$ and the output of gate 82 and between input terminal $\overline{C_1}$ and the output of gate 84, electrical connections are made between the *b* input terminal and the output of gate 81, and between the input terminal $C_1$ and the output of gate 83. Gates 80, 81, 82, 83, and 84 are clocked with a clock pulse while all other gates of the adder are clocked with a $\phi_1$ clock pulse while all other gates of the adder are clocked with a $\phi_2$ clock pulse.

I claim:

1. A device for multiplying an $n$-bit number by an $m$-bit number comprising in combination:

a. at least an $n$-number of multiplicand input terminal means for receiving an $n$-bit number in parallel;

b. a multiplier input means for receiving an $m$-bit number serially;

c. at least an $n$-number of gates with one gate receiving one bit from a respective multiplicand input terminal means and with each gate receiving the serially applied bits from said multiplier input means;

a sign spread circuit interposed between said multiplier input means and said $n$-number of gates for spreading the sign bit of said $m$-bit number;

e. a first delay means, said delay means connected to the output of the first gate;

f. an inverter connected to the output of said first delay means, the output of said inverter connected to a first adder;

g. an $n$-1 number of adders, each connected to receive as an input the output of the remaining gates;

h. delay means connecting the output of each adder to the input of a succeeding adder to enable the sum output from a preceding adder to be summed with the output from a succeeding gate;

i. delay means connected in feedback relation to each adder to store carry bits from the adder for one clock time and to feed the carry bit back to the input of the adder during the next clock pulse; and j. an OR gate interposed between the output of said first adder's feedback delay means and the input of said first adder, one input of said OR gate adapted to receive a timing pulse generated during the least-significant bit of the product of said multiplier and said multiplicand.

2. The invention according to claim 1, wherein the most-significant bit of the $n$-bit number is applied to the $n$th multiplicand input terminal means with the least-significant bit applied to the 1-multiplicand terminal means; and wherein the least-significant bit of the $m$-bit number is applied first to the multiplier's input means.

3. The invention according to claim 1 wherein said delay means retards a received bit for one clock time.

4. The invention according to claim 1 wherein said sign spread circuit comprises:

a. an AND gate having one input terminal connected to said multiplier input means, and another input terminal connected to receive a signal indicative of said multiplier sign bit;

b. a flip-flop connected to be activated to one state by the output of said AND gate and to be activated to another state by a timing pulse originating during the last bit of the product of said multiplier and said multiplicand;

c. an OR gate having one input terminal connected to said multiplier input means, and another input terminal connected to the output of said flip-flop; and d. the output of said OR gate of said sign-spread circuit connected to one input of each of said $n$-number of gates.

5. A serial/parallel multiplication device comprising in combination:

a. an $n$-number of multiplicand input terminals for receiving an $n$-bit number in parallel with the $n$th bit of said number being the most-significant bit which is applied to the $n$-terminal and the one-bit of said number being the least-significant bit applied to the 1-terminal;

b. a serial input terminal, for receiving multiplier bits serially with the least-significant bit of said multiplier appearing first;

c. at least an $n$-number of gates, with each gate receiving one bit from a corresponding multiplicand input terminal and with each gate receiving the bits from said serial input terminal;

d. a sign spread circuit interposed between said serial input terminal and said $n$-number of gates for spreading the sign bit of an input serial number;

e. a plurality of adder means serially connected to each other and each connected to receive the output from one gate exclusive of a first gate;

f. a first delay means connected to the output of said first gate;

g. an inverter connected between a first adder and the said first delay means;

h. delay means interposed between each adder means for delaying the output from a preceding adder means and gate by one clock time;

i. a plurality of delay means connected in feedback relationship around each adder means for delaying the carry bit of said adder for one clock period; and j. an OR gate interposed between the output of said first adder's delay means and the input of said first adder, one input of said OR gate adapted to receive a timing pulse during generation of the least-significant bit of the product of said multiplier and said multiplicand.

6. The invention according to claim 5 wherein said sign spread circuit is comprised of:

a. an AND gate having one input terminal connected to said serial input terminal, and another input terminal connected to receive a signal indicative of said multiplier sign bit;

b. a flip-flop connected to be activated to one state by the output of said AND gate and to be activated to another state by the last bit of the product of said multiplier and said multiplicand;

c. an OR gate having one input terminal connected to said multiplier input means, and another inputs terminal connected to the output of said flip-flop; and d. the output of said OR gate of said sign spread circuit connected to an input of each of said $n$-number of gates.

7. A multiplication device comprising:

a. means for applying an $n$-bit multiplicand number in parallel;

b. means for applying an $m$-bit multiplier number serially;

c. one bit of said multiplier and said multiplicand number indicative of the sign of the respective numbers;

d. means for simultaneously multiplying each bit of said multiplicand by a bit of said multiplier to provide partial products;

e. a shifting register means receiving said partial products providing an output indicative of the product of said multiplicand and said multiplier;

f. means for providing in cooperation with said sign bits an output indicative of the product sign; and g. said means for providing an output indicative of said product sign including sign spread means interposed between said means for applying said multiplier bit number serially and said means for simultaneously multiplying each bit of said multiplicand by a bit of said multiplier.